United States Patent
Namiki

(10) Patent No.: US 12,186,920 B2
(45) Date of Patent: Jan. 7, 2025

(54) ROBOT SYSTEM

(71) Applicant: FANUC CORPORATION, Yamanashi (JP)

(72) Inventor: Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 382 days.

(21) Appl. No.: 17/758,120

(22) PCT Filed: Jan. 8, 2021

(86) PCT No.: PCT/JP2021/000486
§ 371 (c)(1),
(2) Date: Jun. 28, 2022

(87) PCT Pub. No.: WO2021/145280
PCT Pub. Date: Jul. 22, 2021

(65) Prior Publication Data
US 2023/0032421 A1 Feb. 2, 2023

(30) Foreign Application Priority Data
Jan. 14, 2020 (JP) .................. 2020-003862

(51) Int. Cl.
*B25J 9/16* (2006.01)
(52) U.S. Cl.
CPC .................. *B25J 9/1697* (2013.01)
(58) Field of Classification Search
CPC .................. B25J 9/1697; B25J 9/1692; G05B 2219/39045; G05B 2219/39057
See application file for complete search history.

(56) References Cited

U.S. PATENT DOCUMENTS

2015/0025683 A1* 1/2015 Amano .................. B25J 9/1692
700/254
2018/0194008 A1* 7/2018 Namiki .................. G06T 7/80
(Continued)

FOREIGN PATENT DOCUMENTS

| CN | 1727839 A | 2/2006 |
| CN | 104842352 A | 8/2015 |

(Continued)

OTHER PUBLICATIONS

International Search Report issued in PCT/JP2021/000486; mailed Mar. 30, 2021.

*Primary Examiner* — Kira Nguyen
(74) *Attorney, Agent, or Firm* — Studebaker & Brackett PC

(57) ABSTRACT

A robot system is provided which can suitably perform robot movement correction. The robot system is provided with: a visual sensor which captures a first image of a target with the robot in a prescribed position and which captures a second image of the target with the robot in the position resulting from moving the robot a prescribed distance from the aforementioned prescribed position; a calibration data storage unit which stores calibration data that associates the robot coordinate system of the robot and the image coordinate system of the visual sensor; a first acquisition unit which, on the basis of the first image and the calibration data, acquires a first position of the target in the robot coordinate system; a second acquisition unit which, on the basis of the first image and the second image, acquires a second position of the target in the robot coordinate system; and a determination unit which determines whether or not the difference between the first position and the second position is within a prescribed range.

11 Claims, 7 Drawing Sheets

(56) References Cited

U.S. PATENT DOCUMENTS

| | | | | |
|---|---|---|---|---|
| 2019/0015989 A1* | 1/2019 | Inazumi | ................. | B25J 9/1697 |
| 2019/0381669 A1* | 12/2019 | Ogawara | ................. | B25J 9/1687 |
| 2020/0023521 A1* | 1/2020 | Dan | ....................... | B25J 9/1692 |

FOREIGN PATENT DOCUMENTS

| | | | |
|---|---|---|---|
| CN | 107053167 | A | 8/2017 |
| CN | 109382821 | A | 2/2019 |
| CN | 109489558 | A | 3/2019 |
| CN | 109816717 | A | 5/2019 |
| CN | 110114191 | A | 8/2019 |
| JP | H04-035885 | A | 2/1992 |
| JP | 2005-251086 | A | 9/2005 |
| JP | 2006-250722 | A | 9/2006 |
| JP | 2011-230249 | A | 11/2011 |
| JP | 2012-037391 | A | 2/2012 |
| JP | 2014-128845 | A | 7/2014 |
| JP | 2018-113610 | A | 7/2018 |
| JP | 2019-063954 | A | 4/2019 |
| JP | 2020-075327 | A | 5/2020 |
| WO | 2018/163450 | A1 | 9/2018 |

* cited by examiner

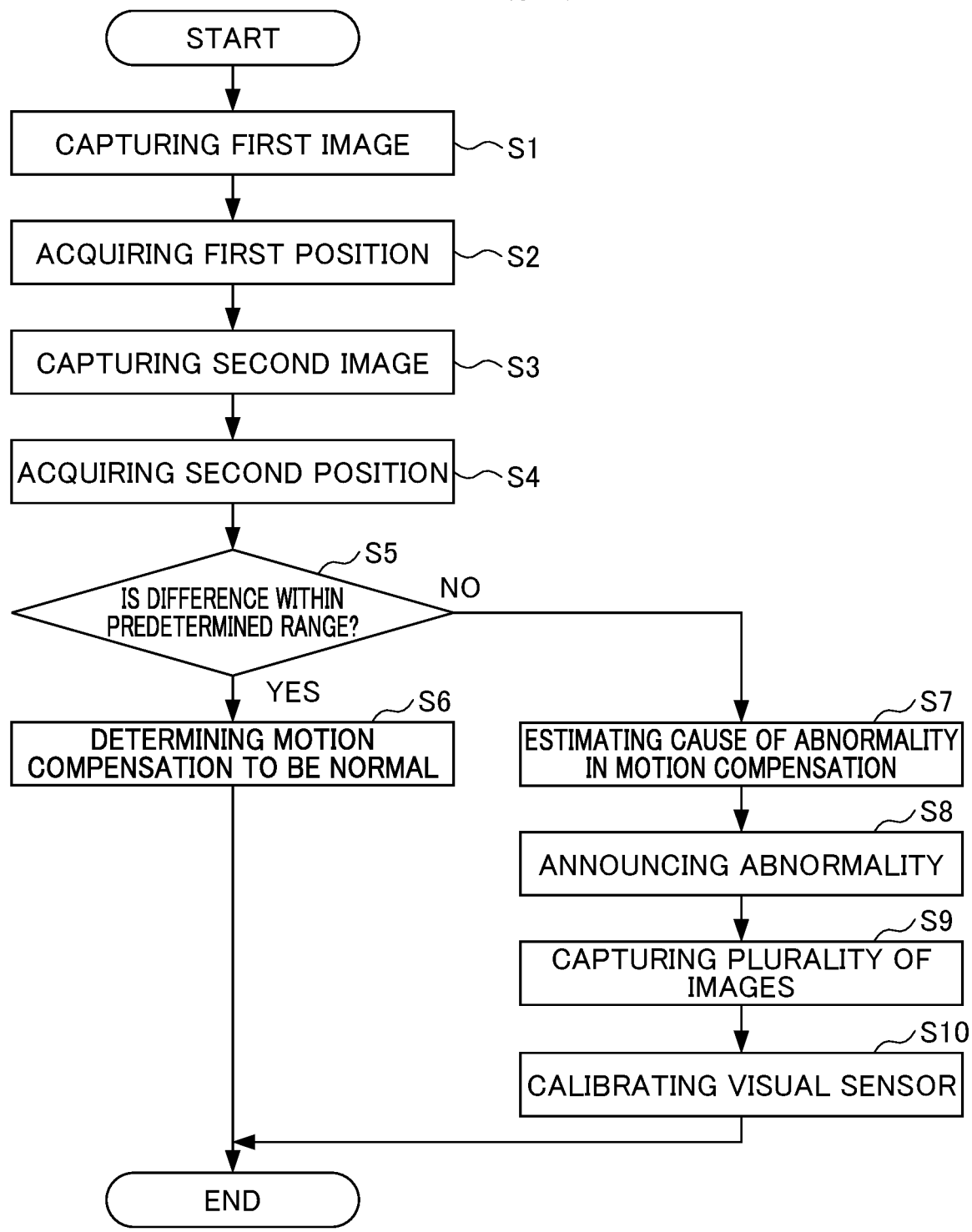

ROBOT SYSTEM

TECHNICAL FIELD

This invention relates to a robot system.

BACKGROUND ART

Conventional robot systems have a visual sensor, such as an imaging device, and recognize the position of a target by means of the visual sensor, and perform operations such as handling and processing the target. The visual sensor captures images of the target by an imaging device installed on a robot at a position near the hand of the robot or by an imaging device installed in an area around the robot.

A robot system of this type detects the target from the captured image and controls motion of the robot such that the robot perform operation with respect to the position of the detected target.

The robot system transforms the position of the detected target (position in an image coordinate system or in a sensor coordinate system as viewed from the visual sensor) to the position of a workpiece as viewed from the robot (position in a robot coordinate system) by using calibration data of the imaging device (see, for example, Patent Document 1). This allows the robot system to compensate motion of the robot such that the robot performs operation with respect to the position of the detected target.

Patent Document 1: Japanese Unexamined Patent Application, Publication No. H4-35885

DISCLOSURE OF THE INVENTION

Problems to be Solved by the Invention

The robot system as mentioned above sometimes fails to correctly implement the visual sensor-based motion compensation of the robot due to various setting errors. In such cases, the robot makes unintended motion. Therefore, there is a demand for means for properly implementing motion compensation of robots.

Means for Solving the Problems

A robot system according to the present disclosure includes: a visual sensor that captures a first image of a target, at a location corresponding to a predetermined position of a robot, and captures a second image of the target, at a location as a result of movement of the robot from the predetermined position by a predetermined distance; a calibration data storage unit that stores calibration data for associating a robot coordinate system of the robot with an image coordinate system of the visual sensor; a first acquisition unit that acquires a first position of the target in the robot coordinate system, based on the first image and the calibration data; a second acquisition unit that acquires a second position of the target in the robot coordinate system, based on the first image and the second image; and a determination unit that determines whether a difference between the first position and the second position is within a predetermined range.

A robot system according to the present disclosure includes: a visual sensor that captures a plurality of images of a target, at a plurality of locations as a result of movement of a robot by a predetermined distance; a calibration data storage unit that stores calibration data for associating a robot coordinate system with an image coordinate system, the robot coordinate system serving as a reference based on which motion of the robot is controlled, the image coordinate system serving as a reference based on which the visual sensor performs measurement processing; a first acquisition unit that acquires a first position of the target in the robot coordinate system, based on the plurality of images and the calibration data; a second acquisition unit that acquires a second position of the target in the robot coordinate system, based on the plurality of images; and a determination unit that determines whether a difference between the first position and the second position is within a predetermined range.

A robot controlling method according to the present disclosure includes: determining setting of motion compensation of a robot; capturing a first image of a target, at a location corresponding to a first position of the robot; capturing a second image of the target, at a location corresponding to a second position as a result of movement of the robot from the first position by a predetermined distance; acquiring a first position of the target in a robot coordinate system, based on the first image and calibration data; acquiring a second position of the target in the robot coordinate system, based on the first image and the second image; determining whether a difference between the first position and the second position is within a predetermined range; in a case where the difference is determined to be outside the predetermined range, estimating a cause of an abnormality in the motion compensation of the robot, based on the first position, the second position, and positions of the robot corresponding to the first position and the second position; and changing the setting of the motion compensation of the robot, based on the estimated cause of the abnormality in the motion compensation of the robot.

A robot controlling method according to the present disclosure includes: a visual sensor that captures a first image of a target, at a location corresponding to a predetermined position of a robot, and captures a second image of the target, at a location as a result of movement of the robot from the predetermined position by a predetermined distance; a calibration data storage unit that stores calibration data for associating a robot coordinate system of the robot with an image coordinate system of the visual sensor; a first acquisition unit that acquires a first position of the target in the robot coordinate system, based on the first image and the calibration data; a second acquisition unit that acquires a second position of the target in the robot coordinate system, based on the first image and the second image; and a determination unit that determines whether a relationship between the first position and the second position is within a predetermined range, based on the first position and the second position.

A robot controlling method according to the present disclosure includes: a visual sensor that captures a first image of a target, at a location corresponding to a predetermined position of a robot, and captures a plurality of images of the target, at a plurality of locations as a result of movement of the robot from the predetermined position by a predetermined distance; a calibration data storage unit that stores calibration data for associating a robot coordinate system of the robot with an image coordinate system of the visual sensor; a first acquisition unit that acquires a first position of the target in the robot coordinate system, based on the first image of the target and the calibration data; a second acquisition unit that acquires a second position of the target in the robot coordinate system, based on the first image and the plurality of images; and a determination unit that determines whether a relationship between the first position and the plurality of locations is within a predetermined range, based on the first position and the plurality of locations.

Effects of the Invention

The present invention makes it possible to properly implement motion compensation of the robot.

BRIEF DESCRIPTION OF THE DRAWINGS

FIG. 9 is a flowchart illustrating processing performed by the visual sensor controller.

PREFERRED MODE FOR CARRYING OUT THE INVENTION

Figure 1:
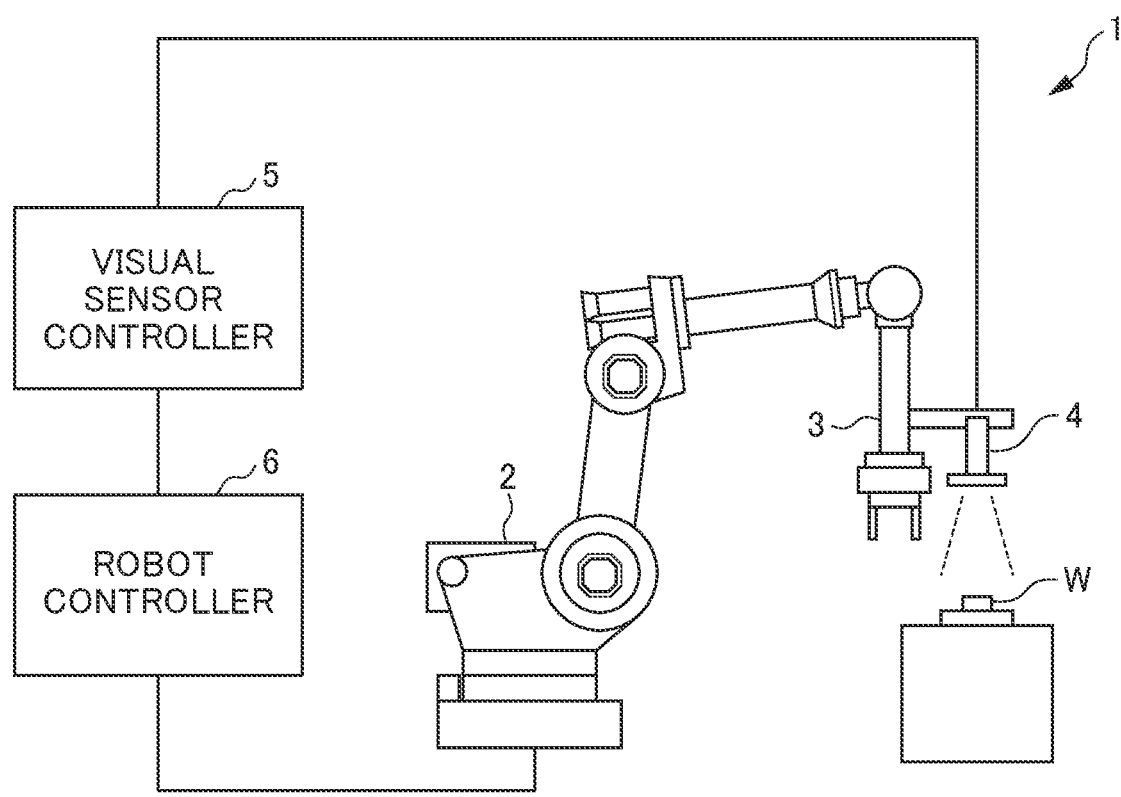
FIG. 1 is a diagram illustrating a configuration of a robot system.

An embodiment of the present invention will be described below. FIG. 1 is a diagram illustrating a configuration of a robot system 1. As illustrated in FIG. 1, the robot system 1 includes a robot 2, an arm 3, a visual sensor 4, a visual sensor controller 5, and a robot controller 6. For example, the robot system 1 recognizes the position of a target W based on an image of the target W captured by the visual sensor 4, and performs operations such as handling the target W and processing the target W.

The arm 3 of the robot 2 has a hand or a tool attached to the distal end of the arm 3. The robot 2 performs operations such as handling or processing the target W under control of the robot controller 6. The visual sensor 4 is attached to the distal end of the arm 3 of the robot 2.

The visual sensor 4 captures images of the target W under control of the visual sensor controller 5. The visual sensor 4 may be configured as a two-dimensional camera that has an imaging element constituted by a charge coupled device (CCD) image sensor and an optical system including a lens. Alternatively, the visual sensor 4 may be configured as a stereo camera or the like that is capable of conducting three-dimensional measurement.

The robot controller 6 executes a motion program of the robot 2 to control motion of the robot 2. When controlling the motion of the robot 2, the robot controller 6 compensates the motion of the robot 2 to cause the robot 2 to perform a predetermined operation with respect to the position of the target W detected by the visual sensor controller 5.

Figure 2:
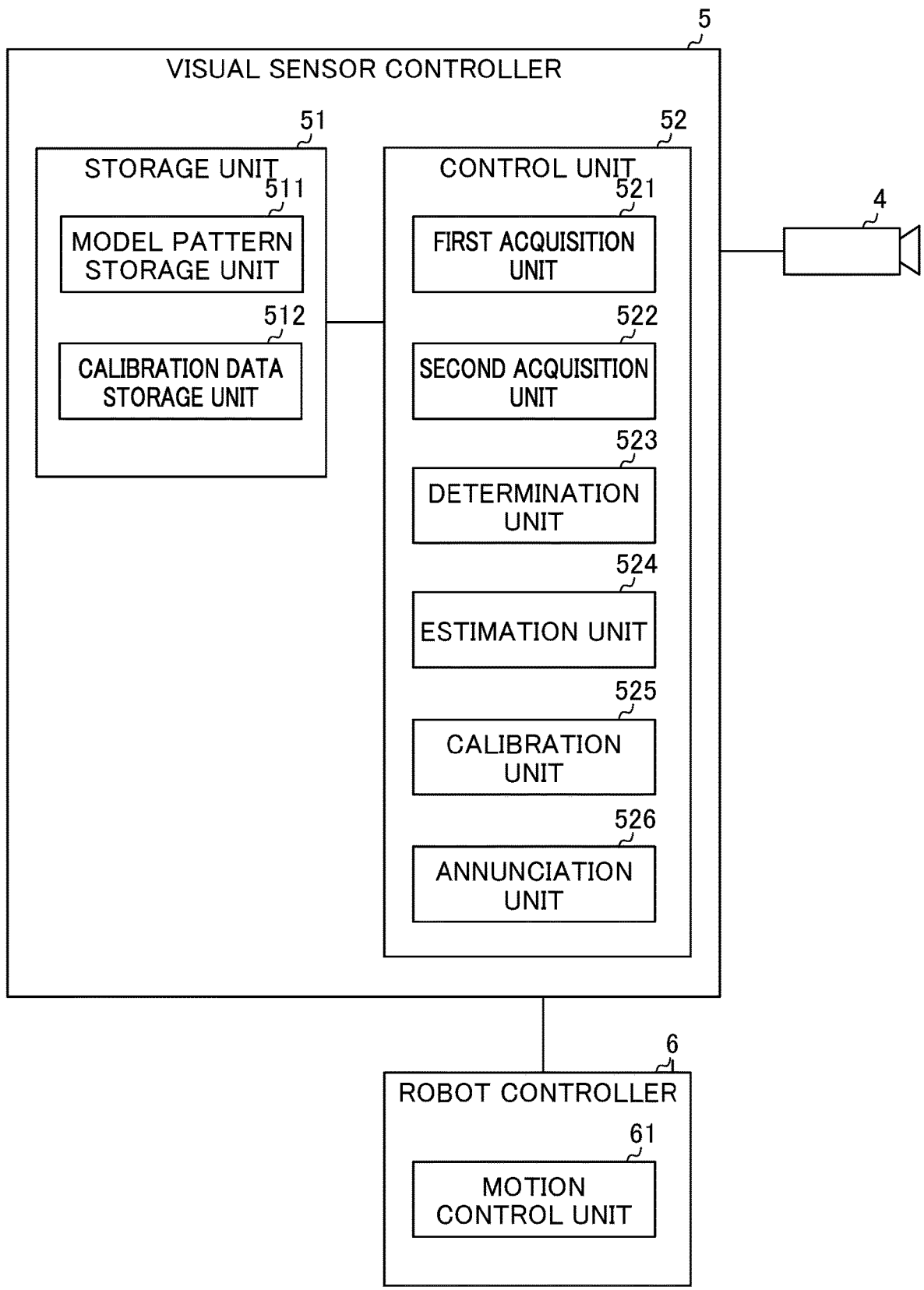
FIG. 2 is a diagram illustrating a configuration of a visual sensor controller and a configuration of a robot controller.

FIG. 2 is a diagram illustrating the configuration of the visual sensor controller 5 and the configuration of the robot controller 6. The visual sensor controller 5 includes a storage unit 51 and a control unit 52. The storage unit 51 is a storage device including, for example, read only memory (ROM) that stores an operating system (OS), application programs, etc., random access memory (RAM), a hard disk drive or a solid state drive (SSD) that stores various other pieces of information, etc.

The storage unit 51 includes a model pattern storage unit 511 and a calibration data storage unit 512. The model pattern storage unit 511 stores a model pattern produced by modeling an image of the target W. For example, the model pattern represents the characteristics of the image of the target W.

The calibration data storage unit 512 stores calibration data for associating a robot coordinate system with an image coordinate system. The robot coordinate system serves as a reference based on which the motion of the robot 2 is controlled. The image coordinate system serves as a reference based on which the visual sensor 4 performs measurement processing. For the calibration data, various formats and various methods for determining the formats have been proposed. Any of the proposed format and methods may be employed.

The control unit 52 is a processor such as a central processing unit (CPU), and executes programs stored in the storage unit 51 to function as a first acquisition unit 521, a second acquisition unit 522, a determination unit 523, an estimation unit 524, a calibration unit 525, and an annunciation unit 526.

The first acquisition unit 521 acquires a first position Pw of the target W in the robot coordinate system, based on a first image of the target W captured by the visual sensor 4 and the calibration data.

The second acquisition unit 522 acquires a second position Ps of the target W in the robot coordinate system, based on the first image and a second image of the target W.

The determination unit 523 determines whether a difference between the first position Pw and the second position Ps is within a predetermined range.

In a case where the determination unit 523 determines that the difference is outside the predetermined range, the estimation unit 524 estimates a cause of an abnormality in the motion compensation of the robot 2, based on the first position Pw, the second position Ps, and positions of the robot 2 corresponding to the first position Pw and the second position Ps.

Alternatively, in the case where the determination unit 523 determines that the difference is outside the predetermined range, the visual sensor 4 captures, at a plurality of locations, a plurality of images of the target W. The estimation unit 524 then estimates a cause of the abnormality in the motion compensation of the robot 2, based on the plurality of images and the plurality of locations.

The calibration unit 525 performs calibration of the visual sensor 4. Details of the calibration of the visual sensor 4 will be described later. In the case where the determination unit 523 determines that the difference is outside the predetermined range, the annunciation unit 526 announces the presence of an abnormality in the motion compensation of the robot 2. Further, the annunciation unit 526 announces the cause of the abnormality estimated by the estimation unit 524. For example, the annunciation unit 526 provides the annunciation in such a manner that an abnormality message is displayed on a display (not shown) or the like.

The robot controller 6 includes a motion control unit 61. The motion control unit 61 executes the motion program of the robot 2 to control the motion of the robot 2.

Figure 5:
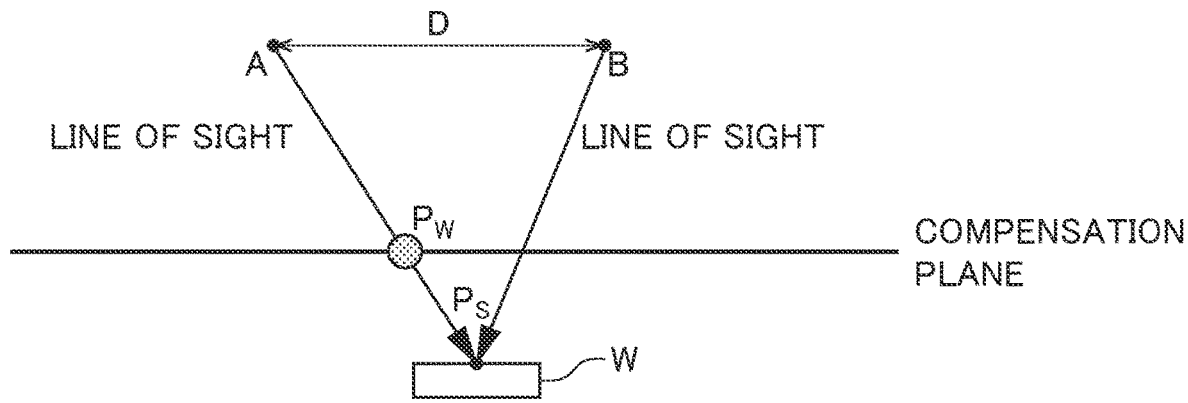
FIG. 5 is a diagram illustrating a relationship between a first position Pw and a second position Ps.
Figure 6:
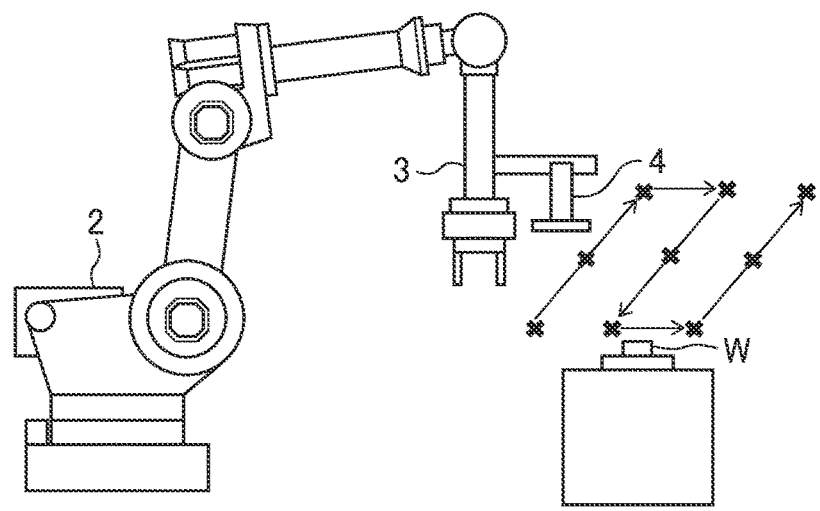
FIG. 6 is a diagram illustrating movement of the visual sensor.
Figure 7:
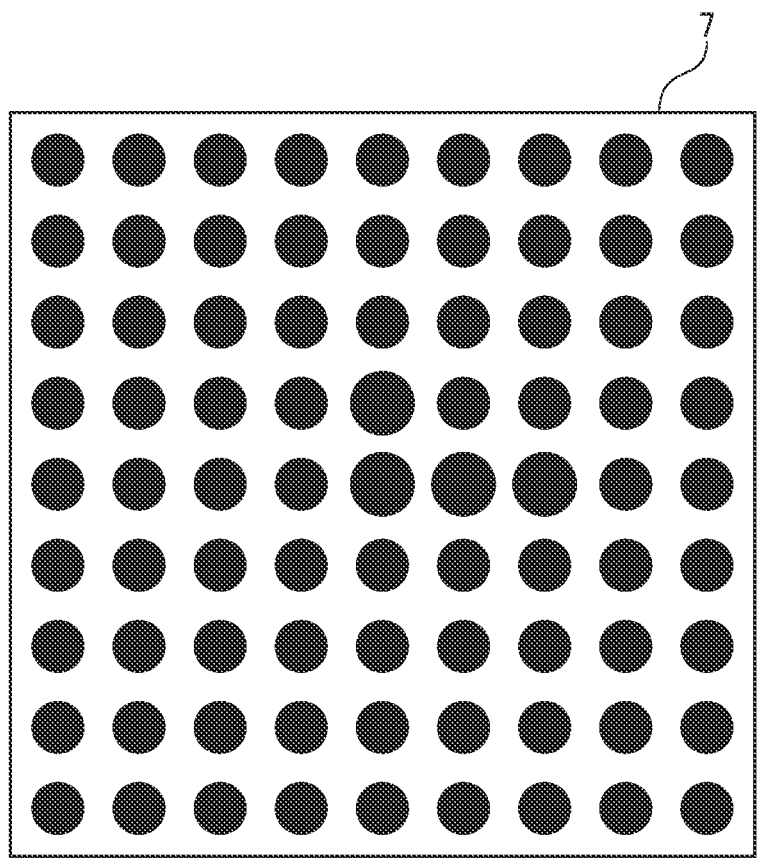
FIG. 7 is a diagram illustrating a calibration jig for calibration.
Figure 8:
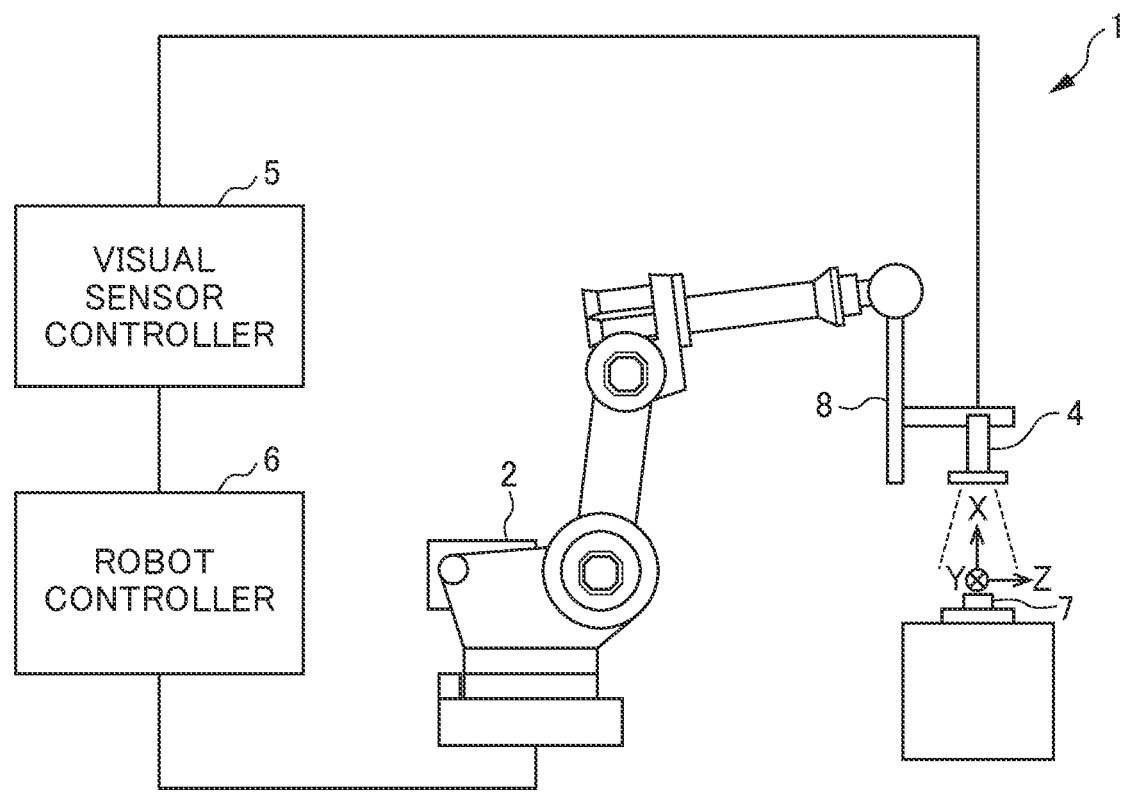
FIG. 8 is a diagram illustrating calibration performed using the calibration jig.

Next, the details of the operation performed by the visual sensor controller 5 will be described with reference to FIGS. 3 to 8. First, the calibration unit 525 calibrates the visual sensor 4 in the following manner, for example. FIG. 7 is a diagram illustrating a calibration jig 7 for calibration. FIG. 8 is a diagram illustrating the calibration that is performed using the calibration jig 7. The calibration jig 7 has a dot pattern illustrated in FIG. 7, which is recognizable to the visual sensor 4. The dot pattern is composed of large and small dots arranged in a grid pattern. The large dots are arranged in an L-shape and represent a coordinate system of the calibration jig 7.

The calibration unit 525 presets a position of the calibration jig 7 viewed from the robot coordinate system. The intervals between the dots of the calibration jig 7 are known in advance from, for example, the design drawing of the calibration jig 7. Accordingly, the calibration unit 525 specifies the known values as the intervals between the dots and stores data regarding the intervals between the dots as a part of the calibration data in the calibration data storage unit 512.

The visual sensor 4 captures an image of the calibration jig 7. The calibration unit 525 acquires a position where the robot was when the image of the calibration jig 7 was captured. The motion control unit 61 causes the robot 2 to perform vertical motion with respect to the calibration jig 7, and the visual sensor 4 then captures an image of the calibration jig 7. The calibration unit acquires a position where the robot was when the image of the calibration jig 7 was captured.

The calibration unit 525 calibrates the visual sensor 4 by using information regarding the positions of the plurality of dots of the calibration jig 7 in the image coordinate system and information regarding the positions of the plurality of dots of the calibration jig 7 in the robot coordinate system, the information both being based on the captured images of the calibration jig 7.

Figure 3:
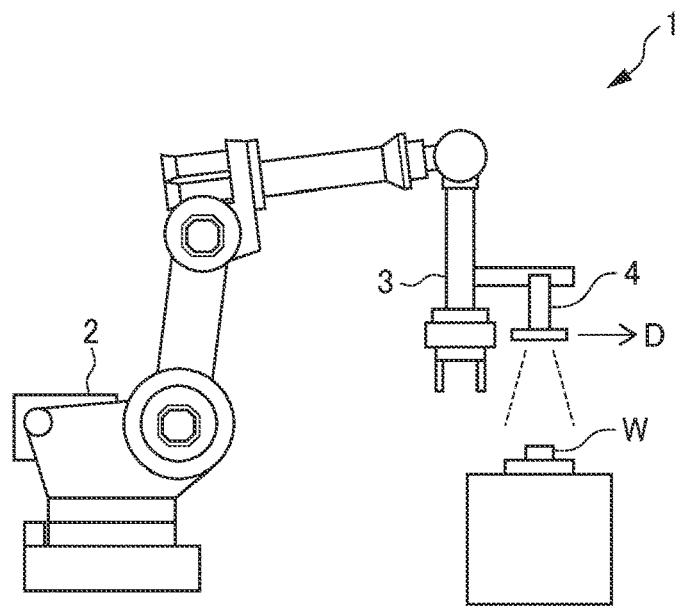
FIG. 3 is a diagram illustrating movement of the visual sensor.

The calibration of the visual sensor 4 allows external parameters and internal parameters of the visual sensor 4 to be determined. Here, the external parameters are information regarding the position and posture of the visual sensor, whereas the internal parameters are information regarding conditions of the optical system of the visual sensor, such as the focal length of a lens, distortion of the lens, and the dimension of a light-receiving element. FIG. 3 is a diagram illustrating movement of the visual sensor 4. First, the motion control unit 61 of the robot controller 6 moves the robot 2 such that the target W is within an imaging range. The visual sensor 4 then captures a first image of the target W. At this time, the first acquisition unit 521 stores the position where the robot 2 was at the time of capturing the image.

The first acquisition unit 521 detects the target W from a predetermined range of the captured first image, by referring to the model pattern stored in the model pattern storage unit 511. In this way, the first acquisition unit 521 acquires the position and posture of the target W in the image coordinate system.

The first acquisition unit 521 transforms the position of the target W in the image coordinate system to a three-dimensional position Pw in the robot coordinate system (world coordinate system), based on the calibration data stored in the calibration data storage unit 512 and the position of the robot 2 at the time of capturing the image. In this way, the first acquisition unit 521 acquires the first position Pw of the target W in the robot coordinate system.

Here, when a two-dimensional camera is used to detect the target W, the first acquisition unit 521 acquires the first position Pw as a three-dimensional position, while assuming that the location at which the target W is detected is on a certain plane (compensation plane). This compensation plane is typically set by a user using an operation panel (not shown) or the like connected to the visual sensor controller 5.

Usually, the motion compensation of the robot 2 is implemented using the first position Pw of the target W. At this time, absolute position compensation and relative position compensation are employed as the motion compensation methods. According to the absolute position compensation, the motion control unit 61 moves a tool center point (TCP) 8 (see FIG. 8) of the robot 2 to the first position Pw. According to the relative position compensation, the control unit 52 determines in advance a position as a reference (reference position) of the target and calculates, as a compensation value, a difference between the reference position and the first position Pw. The robot controller 6 then implements motion compensation of the robot 2 by adding the calculated compensation value to a preset motion of the robot 2.

In some cases, the above-described settings of the motion compensation are determined incorrectly due to various setting errors. To identify an error in the motion compensation of the robot 2, the robot system 1 according to the present embodiment performs the following processing.

As illustrated in FIG. 3, the motion control unit 61 of the robot controller 6 moves the robot 2 from the reference position by a predetermined distance D in a direction orthogonal to an optical axis of the visual sensor 4. The visual sensor 4 captures a second image of the target W, at a location as a result of movement of the robot 2 from the reference position by the predetermined distance D. Here, the predetermined distance D refers to a distance from the reference position to a position where the target W is located after being sufficiently moved and where the target W can be detected by the visual sensor 4.

Figure 4:
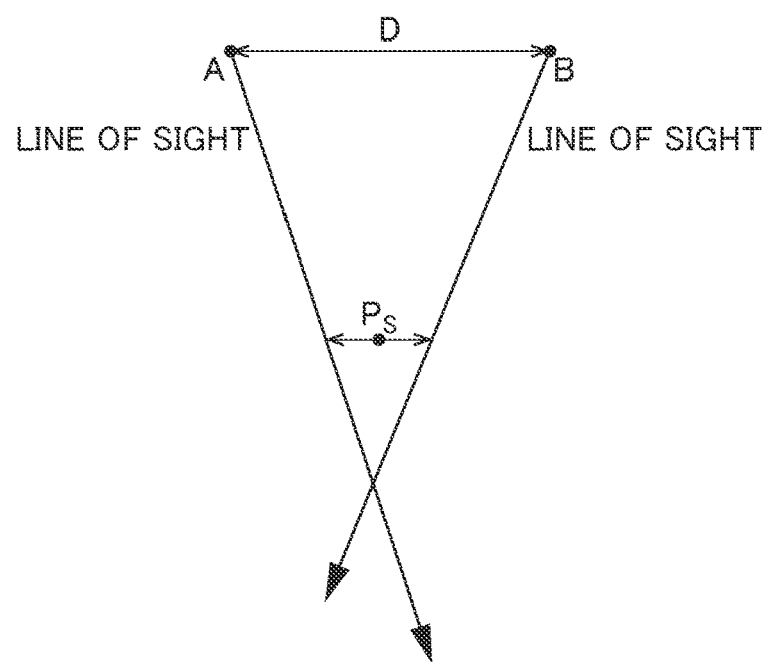
FIG. 4 is a diagram illustrating a second position Ps.

FIG. 4 is a diagram illustrating the second position Ps. FIG. 5 is a diagram illustrating the relationship between the first position Pw and the second position Ps. The second acquisition unit 522 detects the target W from the first image of the target W captured at the location corresponding to the reference position and from the second image of the target W captured at the location as a result of movement of the robot 2 by the predetermined distance D. As a result, the position of the target in the image coordinate system and viewed from two viewpoints A and B is determined.

The second acquisition unit 522 then calculates two lines of sight from the position of the target W in the image coordinate system. The second acquisition unit 522 determines an intersection of the two lines of sight or a point where the distance between the two lines of sight is the shortest, as the second position Ps of the target W.

In the example illustrated in FIG. 4, the two lines of sight do not intersect. Accordingly, the second acquisition unit 522 acquires, as the second position Ps of the target W, the point where the distance between the two lines of sight is the shortest. An image capturing unit may capture a plurality of images as the second images. In this case, the image capturing unit captures an image of the target W at a location as a result of the movement of the robot 2 by the predetermined distance D, and then captures another image of the target W at another location as a result of further movement of the robot 2 by the predetermined distance D from the prior image capturing position. This process is repeated.

In the case where the image capturing unit captures a plurality of images (e.g., three or more images) as the second images, the second acquisition unit 522 calculates three or more viewpoints from the position of the target W in the image coordinate system. In this case, the second acquisition unit 522 calculates, as the second position Ps of the target W, the intersection of the three or more lines of sight or the position where the distance between the three or more line of sight is the shortest by using the least-squares method.

Here, since the target W remains unmoved, while the position of the target W varies in the images, a positional discrepancy (difference) between the first position Pw and the second position Ps should be within a tolerance. Therefore, the determination unit 523 determines whether the difference between the first position Pw and the second position Ps is within a predetermined range.

If the determination unit 523 determines that the difference is within the predetermined range, the estimation unit 524 determines that the motion compensation of the robot 2 is normally implemented. If the determination unit 523 determines that the difference is outside the predetermined range, the estimation unit 524 determines that there is abnormality in the motion compensation of the robot 2, and estimates a cause of the abnormality in the motion compensation of the robot 2, based on the first position Pw, the second position Ps, the positions of the robot 2 corresponding to the first position Pw and the second position Ps.

Specifically, in the case where the determination unit 523 determines that the difference is outside the predetermined range and the two lines of sight do not intersect with each other (e.g., as in FIG. 4), the estimation unit 524 estimates that the calibration data stored in the calibration data storage unit 512 is incorrect.

In the case where the determination unit 523 determines that the difference is outside the predetermined range and the two lines of sight intersects with each other, the estimation unit 524 estimates that a compensation plane is incorrect as illustrated in FIG. 5.

When the calibration data is estimated to be incorrect, calibration is performed according to a different calibration method, whereby the incorrect item of the calibration data can be estimated. FIG. 6 illustrates movement of the visual sensor 4. As illustrated in FIG. 6, the motion control unit 61 moves the robot 2 from the reference position along a grid pattern in directions orthogonal to the optical axis of the visual sensor 4. The visual sensor 4 captures images of the target W, at a plurality of locations as a result of movement of the robot 2. In this way, the plurality of images of the target W are captured by the visual sensor 4.

The calibration unit 525 detects the target W from each of the plurality of captured images, and acquires a position Pci of the target W in the image coordinate system. Further, the calibration unit 525 determines a position Psi of the target W as viewed from the position of a flange of the robot 2 at the time of capturing each of the images. As can be seen, the motion control unit 61 moves the robot 2 $n$ times (i=1, 2, 3, . . . n), and the visual sensor 4 captures images of the target W n times. In this way, the calibration unit 525 acquires n pairs of (Pci, Psi), and calibrates the visual sensor 4 using the n pairs of (Pci, Psi).

The estimation unit 524 compares external parameters and internal parameters of the visual sensor 4 determined in this manner, with the aforementioned external parameters and internal parameters determined in advance by the calibration unit 525 (see FIGS. 7 and 8), and thereby can determine an abnormality in the external parameters and internal parameters.

For example, when the external parameters are incorrect, the estimation unit 524 estimates that the internal parameters determined by way of the calibration are incorrect or that the position of the calibration jig 7 is incorrect. When the internal parameters are incorrect, the estimation unit 524 estimates that the specified intervals between the dots are incorrect or that inappropriate dots have been used in the calibration.

FIG. 9 is a flowchart illustrating processing performed by the visual sensor controller 5. In Step S1, the motion control unit 61 moves the robot 2 such that the target W is within the imaging range, and the visual sensor 4 captures a first image of the target W. At this time, the first acquisition unit 521 stores the position where the robot 2 was at the time of capturing the image.

In Step S2, the first acquisition unit 521 detects the target W from a predetermined range of the captured first image, by using the model pattern stored in the model pattern storage unit 511. The first acquisition unit 521 transforms the position of the target W in the image coordinate system to a first position Pw in the robot coordinate system, based on the calibration data stored in the calibration data storage unit 512 and the position where the robot 2 was at the time of capturing the image.

In Step S3, the motion control unit 61 of the robot controller 6 moves the robot 2 from the reference position by a predetermined distance D in a direction orthogonal to the optical axis of the visual sensor 4. The visual sensor 4 captures a second image of the target W, at a location as a result of movement of the robot 2 by the predetermined distance D.

In Step S4, the second acquisition unit 522 detects the target W from the first image of the target W captured at the location corresponding to the reference position and from the second image of the target W captured at the location as a result of the movement of the robot 2 by the predetermined distance D.

The second acquisition unit 522 calculates two lines of sight from the position of the target W in the image coordinate system. The second acquisition unit 522 acquires an intersection of the two lines of sight or a point where the distance between the two lines of sight is the shortest, as the second position Ps of the target W.

In Step S5, it is determined whether the difference between the first position Pw and the second position Ps is within a predetermined range. If the difference is within the predetermined range (YES), the process proceeds to Step S6. If the difference is outside the predetermined range (NO), the process proceeds to Step S7.

In Step S6, the estimation unit 524 determines that the motion compensation of the robot 2 is normally implemented, and then, the processing ends.

In Step S7, the estimation unit determines that there is an abnormality in the motion compensation of robot 2, and estimates a cause of the abnormality in the motion compensation of the robot 2, based on the first position Pw, the second position Ps, and the positions of the robot 2 corresponding to the first position Pw and the second position Ps.

In Step S8, the annunciation unit 526 announces the presence of the abnormality in the motion compensation of the robot. Further, the annunciation unit 526 announces the cause of the abnormality estimated by the estimation unit 524.

In Step S9, the motion control unit 61 moves the robot 2 from the reference position along a grid pattern in directions orthogonal to the optical axis of the visual sensor 4. The visual sensor 4 captures an image of the target W at each of a plurality of locations as a result of movement of the robot 2. In this way, the visual sensor 4 captures a plurality of images of the target W.

In Step S10, the calibration unit 525 detects the target W from each of the plurality of captured images and acquires a position Pci of the target W in the image coordinate system. Further, the calibration unit 525 determines a position Psi of the target W as viewed from the position of the flange of the robot 2 at the time of capturing each image. The calibration unit 525 calibrates the visual sensor 4 by using n pairs (Pci, Psi) acquired in the above-described manner.

According to the present embodiment, the robot system 1 includes: the visual sensor 4 that captures the first image of the target W, at a location corresponding to the reference position of the robot 2, and captures the second image of the target W, at a location as a result of movement of the robot 2 from the reference position by the predetermined distance D; the calibration data storage unit 512 that stores the calibration data for associating the robot coordinate system with the image coordinate system, the robot coordinate system serving as a reference based on which motion of the robot 2 is controlled, the image coordinate system serving as a reference based on which the visual sensor 4 performs measurement processing; the first acquisition unit 521 that acquires the first position Pw of the target W in the robot coordinate system, based on the first image and the calibration data; the second acquisition unit 522 that acquires the second position Ps of the target W in the robot coordinate system, based on the first image and the second image; and the determination unit 523 that determines whether the difference between the first position Pw and the second position Ps is within the predetermined range. Due to this feature, the robot system 1 can determine an abnormality in the motion compensation of the robot 2, based on the difference between the first position Pw and the second position Ps.

The robot system 1 further includes the estimation unit 524 that estimates, in the case where the determination unit 523 determines that the difference is outside the predetermined range, a cause of the abnormality in the motion compensation of the robot 2, based on the first position, the second position, and the positions of the robot 2 corresponding to the first position and the second position. When there is an abnormality in the motion compensation of the robot 2, this feature allows the robot system 1 to estimate a cause of the abnormality. Thus, the robot system 1 can properly implement the motion compensation of the robot 2, based on the estimated cause of the abnormality in the motion compensation of the robot 2.

In the robot system 1, in the case where the determination unit 523 determines that the difference is outside the predetermined range, the visual sensor 4 captures, at a plurality of locations, a plurality of images of the target W, and the estimation unit 524 estimates a cause of the abnormality in the motion compensation of the robot 2, based on the plurality of images and the plurality of positions. Due to this feature, the robot system 1 can properly implement the motion compensation of the robot 2.

The visual sensor 4 may capture a plurality of second images of the target W, and the second acquisition unit 522 may acquire a plurality of second positions of the target W in the robot coordinate system, based on the first image and the plurality of second images.

Due to this feature, the robot system 1 can determine the cause of the abnormality in the position compensation of the robot 2, using the plurality of second images and the plurality of second positions. The robot system 1 may further include a setting change unit that changes the setting of the motion compensation of the robot, based on the cause of the abnormality in the motion compensation of the robot, the cause having been estimated by the estimation unit 524. This feature allows the robot system 1 to appropriately change the setting of the motion compensation of the robot.

In the embodiment described above, the robot system 1 uses the first image and the second image. However, the robot system may use only an image or images corresponding to the second image, for example. For example, the robot system 1 may include: a first acquisition unit 521 that acquires a first position of the target W in the robot coordinate system, based on a plurality of second images and calibration data; and a second acquisition unit 522 that acquires a second position of the target W in the robot coordinate system based on the plurality of second images.

Instead of the configuration of the embodiment described above, the determination unit 523 of the robot system 1 can use, for example, a method for checking respective elements of a difference in three-dimensional position between the first position Pw and the second position, or a method for checking a distance. In other words, the determination unit 523 may check whether a relationship between the first position Pw and the second position Ps is within a predetermined range, based on a difference between the first position Pw and the second position Ps. Further, instead of the configuration of the embodiment described above, the determination unit 523 of the robot system 1 may use a method for measuring a distribution or standard deviation of three or more positions. In other words, the determination unit 523 may determine whether a relationship between the first position and a plurality of positions is within a predetermined range, based the first position and the plurality of positions.

It should be noted that the embodiments described above are not intended to limit the present invention. The effects described in the embodiments are merely most favorable effects exerted by the present invention. The effects of the present invention are not limited to those described above.

EXPLANATION OF REFERENCE NUMERALS

1: Robot system
2: Robot
3: Arm
4: Visual sensor
5: Visual sensor controller
6: Robot controller
61: Motion control unit
511: Model pattern storage unit
512: Calibration data storage unit
521: First acquisition unit
522: Second acquisition unit
523: Determination unit
524: Estimation unit
525: Calibration unit
526: Annunciation unit

The invention claimed is:
1. A robot system comprising:
a visual sensor that captures a first image of a target, at a location corresponding to a position of a robot, and captures a second image of the target, at a location as a result of movement of the robot from the position by a distance;
a calibration data storage unit that stores calibration data for associating a robot coordinate system of the robot with an image coordinate system of the visual sensor;
a first acquisition unit that acquires a first position of the target in the robot coordinate system, based on the first image and the calibration data;

a second acquisition unit that acquires a second position of the target in the robot coordinate system, based on the first image and the second image; and a determination unit that determines whether a difference between the first position and the second position is within a predetermined range.

2. The robot system according to claim 1, further comprising:

an estimation unit that estimates, in a case where the determination unit determines that the difference is outside the predetermined range, a cause of an abnormality in motion compensation of the robot, based on the first position, the second position, and positions of the robot corresponding to the first position and the second position.

3. The robot system according to claim 2, wherein in the case where the determination unit determines that the difference is outside the predetermined range, the visual sensor captures a plurality of images of the target, at a plurality of locations, and the estimation unit estimates the cause of the abnormality in the motion compensation of the robot, based on the plurality of images and the plurality of locations.

4. The robot system according to claim 2, further comprising:

an annunciation unit that announces presence of the abnormality in the motion compensation of the robot in the case where the determination unit determines that the difference is outside the predetermined range.

5. The robot system according to claim 4, wherein the annunciation unit announces the cause of the abnormality, the cause having been estimated by the estimation unit.

6. The robot system according to claim 2, further comprising:

a setting change unit that changes setting of the motion compensation of the robot, based on the cause of the abnormality in the motion compensation of the robot, the cause having been estimated by the estimation unit.

7. The robot system according to claim 1, wherein the visual sensor captures the second image comprising a plurality of second images of the target, and the second acquisition unit acquires the second position comprising a plurality of second positions of the target in the robot coordinate system, based on the first image and the plurality of second images.

8. A robot system comprising:

a visual sensor that captures a plurality of images of a target, at a plurality of locations as a result of movement of a robot by a distance;

a calibration data storage unit that stores calibration data for associating a robot coordinate system with an image coordinate system, the robot coordinate system serving as a reference based on which motion of the robot is controlled, the image coordinate system serving as a reference based on which the visual sensor performs measurement processing;

a first acquisition unit that acquires a first position of the target in the robot coordinate system, based on the plurality of images and the calibration data;

a second acquisition unit that acquires a second position of the target in the robot coordinate system, based on the plurality of images; and a determination unit that determines whether a difference between the first position and the second position is within a predetermined range.

9. A robot controlling method comprising:

determining setting of motion compensation of a robot;

capturing a first image of a target, at a location corresponding to a first position of the robot;

capturing a second image of the target, at a location corresponding to a second position as a result of movement of the robot from the first position by a distance;

acquiring a first position of the target in a robot coordinate system, based on the first image and calibration data;

acquiring a second position of the target in the robot coordinate system, based on the first image and the second image;

determining whether a difference between the first position and the second position is within a predetermined range;

in a case where the difference is determined to be outside the predetermined range, estimating a cause of an abnormality in the motion compensation of the robot, based on the first position, the second position, and positions of the robot corresponding to the first position and the second position; and changing the setting of the motion compensation of the robot, based on the estimated cause of the abnormality in the motion compensation of the robot.

10. A robot system comprising:

a visual sensor that captures a first image of a target, at a location corresponding to a position of a robot, and captures a second image of the target, at a location as a result of movement of the robot from the position by a distance;

a calibration data storage unit that stores calibration data for associating a robot coordinate system of the robot with an image coordinate system of the visual sensor;

a first acquisition unit that acquires a first position of the target in the robot coordinate system, based on the first image and the calibration data;

a second acquisition unit that acquires a second position of the target in the robot coordinate system, based on the first image and the second image; and a determination unit that determines whether a relationship between the first position and the second position is within a predetermined range, based on the first position and the second position.

11. A robot system comprising:

a visual sensor that captures a first image of a target, at a location corresponding to a position of a robot, and captures a plurality of images of the target, at a plurality of locations as a result of movement of the robot from the position by a distance;

a calibration data storage unit that stores calibration data for associating a robot coordinate system of the robot with an image coordinate system of the visual sensor;

a first acquisition unit that acquires a first position of the target in the robot coordinate system, based on the first image of the target and the calibration data;

a second acquisition unit that acquires a second position of the target in the robot coordinate system, based on the first image and the plurality of images; and a determination unit that determines whether a relationship between the first position and the plurality of locations is within a predetermined range, based on the first position and the plurality of locations.

* * * * *